United States Patent
Luo

(10) Patent No.: US 9,342,173 B2
(45) Date of Patent: May 17, 2016

(54) METHOD AND DEVICE FOR IMPLEMENTING CLICK AND LOCATION OPERATIONS ON TOUCH SCREEN

(75) Inventor: Yijun Luo, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 129 days.

(21) Appl. No.: 14/344,927

(22) PCT Filed: Dec. 22, 2011

(86) PCT No.: PCT/CN2011/084464
§ 371 (c)(1),
(2), (4) Date: Mar. 14, 2014

(87) PCT Pub. No.: WO2012/152011
PCT Pub. Date: Nov. 15, 2012

(65) Prior Publication Data
US 2014/0232674 A1 Aug. 21, 2014

(30) Foreign Application Priority Data
Sep. 16, 2011 (CN) .......................... 2011 1 0276130

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01)

(58) Field of Classification Search
None
See application file for complete search history.

(56) References Cited

U.S. PATENT DOCUMENTS

| 8,237,665 B2 * | 8/2012 | Duncan .............. G06F 3/04886 178/18.01 |
| 9,032,319 B1 * | 5/2015 | Hammack ............. G06F 3/0486 715/769 |
| 2006/0244735 A1 | 11/2006 | Wilson |
| 2007/0097096 A1 | 5/2007 | Rosenberg |

(Continued)

FOREIGN PATENT DOCUMENTS

| AU | 2010212022 A1 | 8/2011 |
| CA | 2749916 A1 | 8/2010 |

(Continued)

OTHER PUBLICATIONS

English Translation of the Written Opinion of the International Search Authority in international application No. PCT/CN2011/084464, mailed on Jun. 14, 2012.

(Continued)

*Primary Examiner* — Adam R Giesy
(74) *Attorney, Agent, or Firm* — Brundidge & Stanger, P.C.

(57) ABSTRACT

A method for implementing click and location operations on a touch screen is disclosed. The method includes: a position relation between a touch point and a target point is set such that the touch point is separated from the target point; position information of the touch point is acquired; position information of the target point is calculated based on the position information of the touch point and the position relation between the touch point and the target point, and a position of the target point is displayed; and a confirmation operation is performed according to the displayed position of the target point. A device for implementing click and location operations on a touch screen is further disclosed. With the disclosure, the problem that it is difficult to precisely click and locate when the distance between the operation objects is very small can be solved.

10 Claims, 2 Drawing Sheets

(56) References Cited

U.S. PATENT DOCUMENTS

| | | | | |
|---|---|---|---|---|
| 2008/0291173 | A1* | 11/2008 | Suzuki | A63F 13/10 345/173 |
| 2009/0207144 | A1 | 8/2009 | Bridger | |
| 2009/0303175 | A1* | 12/2009 | Koivunen | A63F 13/10 345/156 |
| 2011/0035700 | A1* | 2/2011 | Meaney | G06F 3/048 715/784 |
| 2011/0291940 | A1 | 12/2011 | Ghassabian | |

FOREIGN PATENT DOCUMENTS

| | | |
|---|---|---|
| CN | 101446872 A | 6/2009 |
| CN | 101840287 A | 9/2010 |
| EP | 0795811 A1 | 9/1997 |
| EP | 2394208 A1 | 12/2011 |
| WO | 2010018579 A2 | 2/2010 |
| WO | 2010018579 A3 | 5/2010 |
| WO | 2010089740 A1 | 8/2010 |

OTHER PUBLICATIONS

International Search Report issued in corresponding application No. PCT/CN2011/084464 on Jun. 14, 2012.

International Publication issued in corresponding application No. PCT/CN2011/084464 on Nov. 15, 2012.

Supplementary European Search Report in European application No. 11865425.0, mailed on Feb. 9, 2015.

* cited by examiner

METHOD AND DEVICE FOR IMPLEMENTING CLICK AND LOCATION OPERATIONS ON TOUCH SCREEN

TECHNICAL FIELD

The disclosure relates to touch screen technology, and particularly refers to a method and device for implementing click and location operations on a touch screen.

BACKGROUND

Currently, the application scope of the touch screen rapidly extends from a former commercial market for the minority, such as automatic teller machines of banks and industrial control computers, to the electronic field for public consumption, such as mobile phones, Personal Digital Assistants (PDAs), Global Positioning Systems (GPSs), Portable Media Players (PMPs) (such as MP3 and MP4), and even Tablet Personal Computers (Tablet PCs). Hopefully, the touch screen, of which the touch and control operation is simple, convenient and humanized, will become an optimum interface for human-machine interaction, and thus can be rapidly popularized.

Touch screen inputting has advantageous, such as simple, convenient, humanized operation and the like, but also has disadvantageous: it is very difficult to perform precise click and location operations. For example, when inputting a text, one letter in a word is wrong, and the wrong letter is desired to be selected and amended. In this case, it is very difficult for operation, and it is easy to make a wrong selection. That is mainly because: the distance between letters is very small, and when a finger operates on the touch screen, the touching area between the finger and the touch screen is large. Moreover, when performing operations (such as click) with the finger, the finger covers the sight line of the user, so it is very difficult to perform a precise operation with the finger. Of course, the problem may be solved by using a handwriting pen, but carrying and using the handwriting pen also brings inconvenience to the user. Therefore, there is the problem that the user experience is not good when an operation is performed on the touch screen, as long as the distance between operation objects is very small.

SUMMARY

In view of this, the disclosure is intended to provide a method and device for implementing click and location operations on a touch screen, to solve the problem that it is difficult to precisely click and locate when the distance between operation objects is very small.

To this end, a technique solution of the disclosure is implemented as followings.

A method for implementing click and location operations on a touch screen is provided, which includes:

a position relation between a touch point and a target point is set such that the touch point is separated from the target point;

position information of the touch point is acquired;

position information of the target point is calculated based on the position information of the touch point and the position relation between the touch point and the target point, and a position of the target point is displayed; and a confirmation operation is performed according to the displayed position of the target point.

After the position information of the touch point is acquired, the method may further include:

it is determined, according to the position information of the touch point, whether the touch point is located in an area where a precise click and location is required; and when the touch point is located in an area where a precise click and location is required, the position information of the target point is calculated based on the position information of the touch point and the position relation between the touch point and the target point.

Before the confirmation operation is performed according to the displayed position of the target point, the method may further include:

when it is determined, according to the displayed position of the target point, that the position of the target point needs to be fine-tuned, a touch object is moved and the position information of the touch point is re-acquired; and the position information of the target point is re-calculated based on the re-acquired position information of the touch point and the position relation between the touch point and the target point, and the re-calculated position of the target point is displayed.

The process that the confirmation operation is performed according to the displayed position of the target point may include:

the touch object leaves the touch screen, so as to confirm the position of the target point; or the touch object touches and then leaves the touch screen, so as to confirm the position of the target point.

A device for implementing click and location operations on a touch screen is provided, which includes:

a location information setting module configured to set a position relation between a touch point and a target point such that the touch point is separated the target point;

a location information acquiring module configured to acquire position information of the touch point;

a location information feedback module configured to: calculate position information of the target point based on the position information of the touch point and the position relation between the touch point and the target point, and display a position of the target point; and an operation confirming module configured to perform a confirmation operation for a user according to the displayed position of the target point.

The location information feedback module may be further configured to: determine, according to the position information of the touch point, whether the touch point is located in an area where a precise click and location is required; and when the touch point is located in an area where a precise click and location is required, calculate the position information of the target point based on the position information of the touch point and the position relation between the touch point and the target point.

The location information acquiring module may be further configured to, when a user determines, according to the displayed position of the target point, that the position of the target point needs to be fine-tuned and when the user moves a touch object, re-acquire the position information of the touch point; and the location information feedback module may be further configured to re-calculate the position information of the target point based on the re-acquired position information of the touch point, and display the re-calculated position of the target point.

The operation confirming module may further be configured to, when a touch object leaves the touch screen, confirm the position of the target point; or when the touch object touches and then leaves the touch screen, confirm the position of the target point.

With the method and device for implementing click and location operations on the touch screen according to the disclosure, the position relation between the touch point and the target point is set such that the touch point is separated from the target point, so that the problem of covering the sight line of the user by the finger is avoided when the click operation or another operation is performed with a finger; the position information of the target point is calculated based on the position information of the touch point, and the position of the target point is displayed; and the fine-tuning can also be performed according to the displayed position of the target point. Therefore, the precise click and location can also be implemented even though the distance between operation objects is very small.

DETAILED DESCRIPTION

Figure 1:
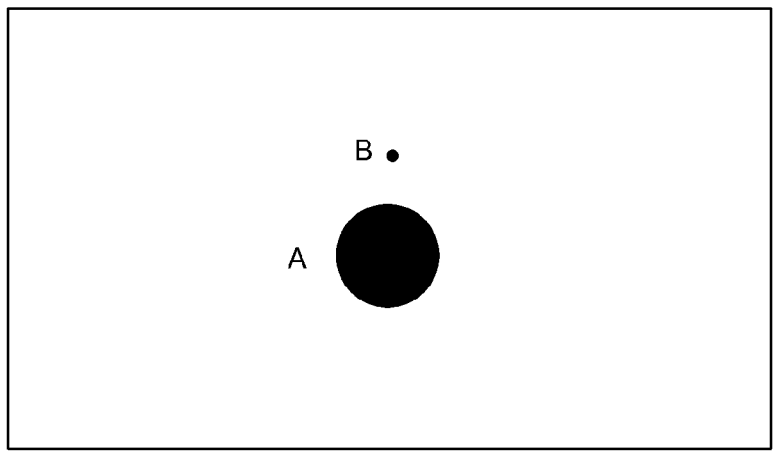
FIG. 1 shows a position relation between a finger and a target point.

In the method for implementing click and location operations on the touch screen according to the disclosure, the target point is separated from the touch point, and the position of the target point is calculated through the position of the touch point and is displayed. As shown in FIG. 1, a point A is a touch point which a finger clicks on a touch screen, and a target point B is calculated according to the point A and is displayed. In this way, a touch object (such as a finger or a stylus) may not cover the sight line of a user, and the position of the target point is adjusted through fine movement of the touch object on the touch screen, so that operations such as precise location and click are implemented.

Figure 2:
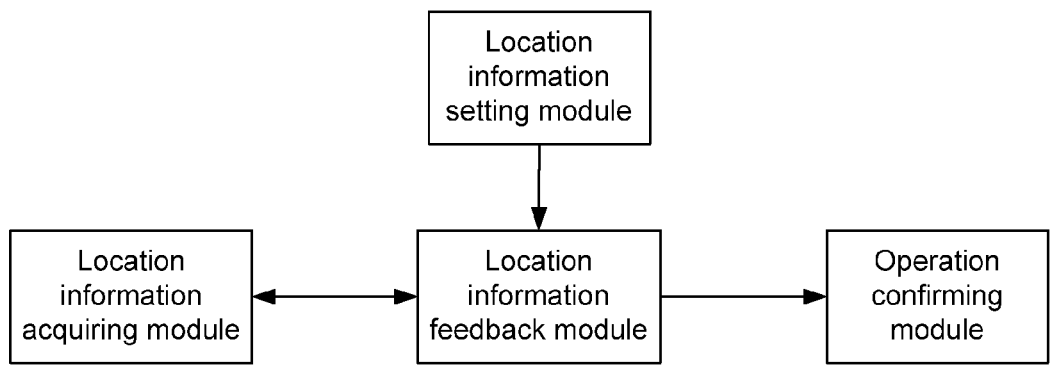
FIG. 2 is a structural diagram of a device for implementing click and location operations on a touch screen according to the disclosure.

As shown in FIG. 2, a device for implementing click and location operations on a touch screen according to the disclosure includes: a location information setting module, a location information acquiring module, a location information feedback module and an operation confirming module.

The location information setting module is configured to set a position relation between a touch point and a target point such that the touch point is separated the target point. For example, the position of the target point may be set as the place of 1-2 cm right above the touch point, and the target point may also be set to be located at the place of 1-2 cm right below the touch point. The setting can be made as required. Thus, the sight line of the user can be avoided by the touch object such as the finger.

The location information acquiring module is configured to acquire the position information of the touch point. There are two implementation modes: the first mode is that the common touch screen technology is adopted, and when the touch object touches the touch screen, the location is performed and the position information of the touch point is acquired; and the second mode is that the non-contact touch screen technology is adopted, and when the distance between the touch object (such as the finger) and the touch screen is about 1 cm, the location is performed and the position information of the touch point is acquired.

In a touch screen system, acquiring the position information of the touch point may include the following steps:

1. receiving the precise position information of the touch point, usually through calling the function getDisplayPoint( ); and 2. reading the acquired position information of the touch point; for example, in an android platform, functions for reading the position information of the touch point are as follows:

float getActiveX(MotionEvent ev) {//acquiring the current X-coordinate return ev.getX( );} float getActiveY(MotionEvent ev) {//acquiring the current Y-coordinate return ev.getY( );}

The location information feedback module is configured to calculate the position information of the target point according to the position information of the touch point, and display the position of the target point on the screen of the touch screen. When the position information of the target point is calculated, the calculation is performed based on the position information of the touch point and the position relation between the touch point and the target point. It is assumed that the position relation between the touch point and the target point is that: the position of the target point is located at the place of 1-2 cm right above the touch point, and then the place of 1-2 cm right above the touch point is the position of the target point.

A specific implementation process of calculating and displaying the position of the target point is as follows:

1. The touch point is separated from the target point, the position relation between the touch point and the target point is set, and the position information of the target point is calculated based on the position information of the touch point; for example, the position of the target point may be set as the place of 1-2 cm right above the touch point, also the target point may be set to be located at the place of 1-2 cm right below the touch point; the setting can be made as required. Separating the touch point from target point and setting the position relation between the touch point and the target point is intended to prevent the touch object from covering the sight line of the user.

2. A function related to the touch operation is reloaded (for example, in the android platform, the function onTouchEvent (MotionEvent ev) is required to be reloaded). The purpose is that: the calculated position of the target point displayed on the screen in the form of the cursor; and the content in the default function, such as pressing the touch screen and moving (for example, slipping left and right on the screen), are removed to avoid generating the conflict with fine-tuning of the touch object on the touch screen when a precise location is performed.

The so-called precise location refers to that the user may determine, according to the position of the target point displayed on the screen, whether the adjustment is required again, and when the adjustment is required it can be implemented by fine-tuning the touch object (such as the finger) on the touch screen.

The operation confirming module is configured to perform a confirmation for the user on the position of the target point fed back by the location information feedback module. Regarding the common touch screen technology, when the touch object leaves the touch screen, the position of the target point is confirmed. Regarding the non-contact touch screen technology, when the touch object touches and then leaves the touch screen, the position of the target point is confirmed. The essence of the above-mentioned operation is to reload the function related to the touch operation and to replace the calculated target point by the touch point.

When it is determined, according to the displayed position of the target point, that the position of the target point needs to be fine-tuned, the user may move the touch object. At this moment, the location information acquiring module re-acquires the position information of the touch point; and the location information feedback module re-calculates the position information of the target point based on the re-acquired position information of the touch point and the position relation between the touch point and the target point, and displays the re-calculated position of the target point. The above-mentioned steps are repeated until the position of the target point is confirmed.

Figure 3:
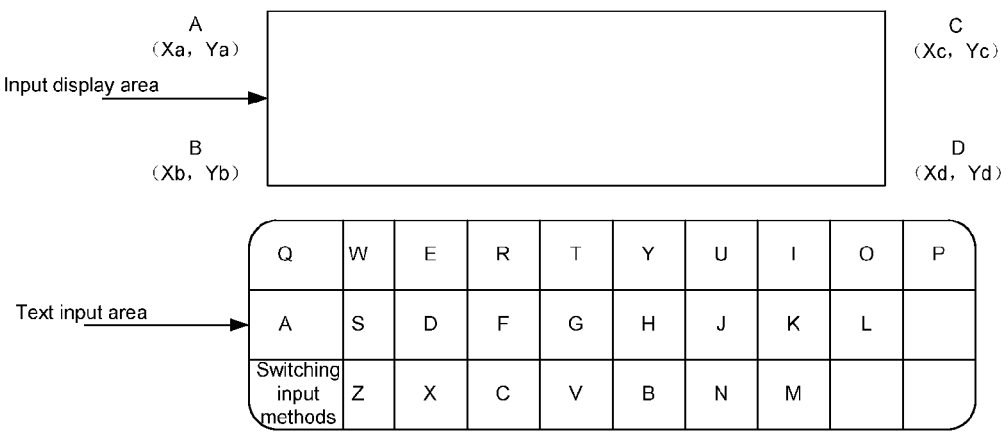
FIG. 3 is an instance diagram of area discrimination.

It should be pointed out that, in regard to some special application scenarios, it is required to implement a precise click and location in part of the area of the touch screen. In the scenario for text input as shown in FIG. 3, the existing touching operation mode may be adopted in a text input area. In order to facilitate modification and edition of the information which has been input, the click and location operation mode provided by the disclosure are required to be adopted in an input display area. In this application scenario, the location information feedback module is also required to determine, according to the position information of the tough point, whether the touch point is located in the area where a precise click and location is required (the input display area as shown in FIG. 3). When the touch point is located in the area where a precise click and location is required, the position information of the target point is calculated based on the position information of the touch point and the position relation between the touch point and the target point. When the touch point is not located in the area where a precise click and location is required, the default touch operation mode of the system may be adopted.

Specifically, in combination with FIG. 3, the mode of implementing the above-mentioned touch point area determination is as follows:

X=float getActiveX(MotionEvent ev); //acquiring the current X-coordinate

Y=float getActiveY(MotionEvent ev); //acquiring the current Y-coordinate

True=X>=Xa & X<=Xb & Y<=Ya & Y>=Yc;

//True is 1, then the touch point is in the area of the rectangle ABCD area (i.e., the input display area).

Figure 4:
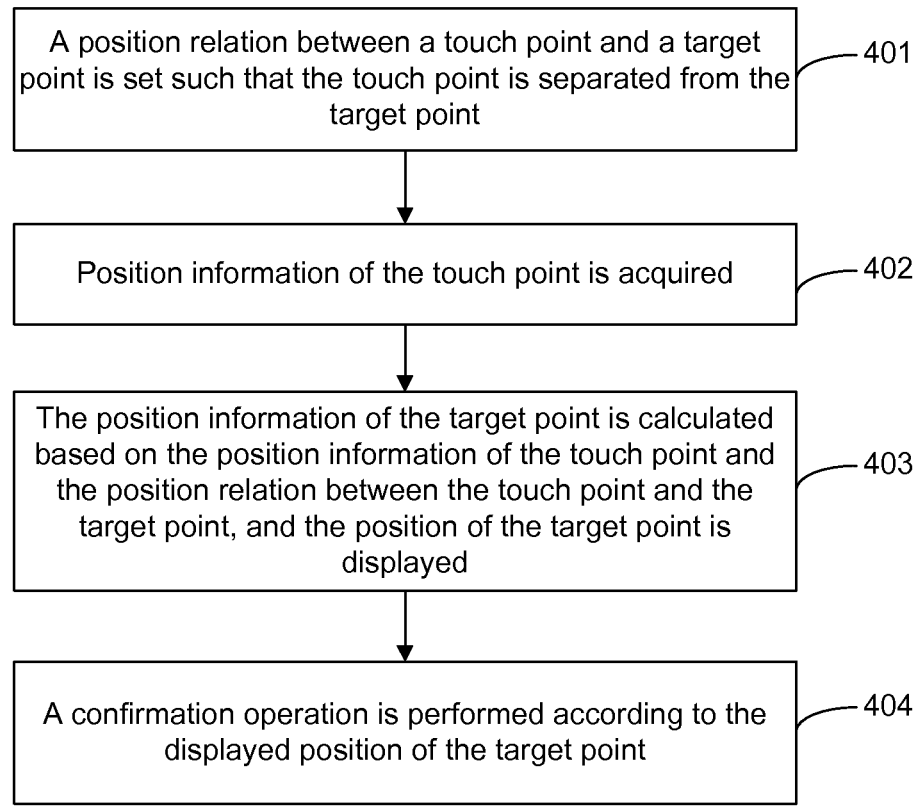
FIG. 4 is a flowchart of a method for implementing click and location operations on a touch screen according to the disclosure.

As shown in FIG. 4, a method for implementing click and location operations on a touch screen according to the disclosure includes:

Step 401: A position relation between a touch point and a target point is set such that the touch point is separated from the target point.

Step 402: Position information of the touch point is acquired.

After the position information of the touch point is acquired, the method further includes: it is determined, according to the position information of the touch point, whether the touch point is located in an area where a precise click and location is required; and when the touch point is located in an area where a precise click and location is required, the position information of the target point is calculated based on the position information of the touch point and the position relation between the touch point and the target point.

Step 403: The position information of the target point is calculated based on the position information of the touch point and the position relation between the touch point and the target point, and the position of the target point is displayed.

Step 404: A confirmation operation is performed according to the displayed position of the target point.

Specifically, the touch object leaves the touch screen, so as to confirm the position of the target point; or, the touch object touches and then leaves the touch screen, so as to confirm the position of the target point.

Before the confirmation operation is performed according to the displayed position of the target point, the method further includes:

when it is determined, according to the displayed position of the target point, that the position of the target point needs to be fine-tuned, the touch object is moved and the position information of the touch point is re-acquired; and the position information of the target point is re-calculated based on the re-acquired position information of the touch point and the position relation between the touch point and the target point, and the re-calculated position of the target point is displayed.

The method for implementing click and location operations of the disclosure is explained through specific embodiments below.

Embodiment 1

The non-contact touch screen technology is adopted, and it is assumed that the distance within which the touch screen can sense the finger of the user is about 1 cm.

The location information setting module set the position relation between the touch point and the target point as: the position of the target objet is located at the place of 2 cm right above the place of the touch point.

The location information acquiring module locates the touch point when the distance between the touch object and the touch screen is about 1 cm, and the touch screen acquires the position information of the touch point.

Figure 5:
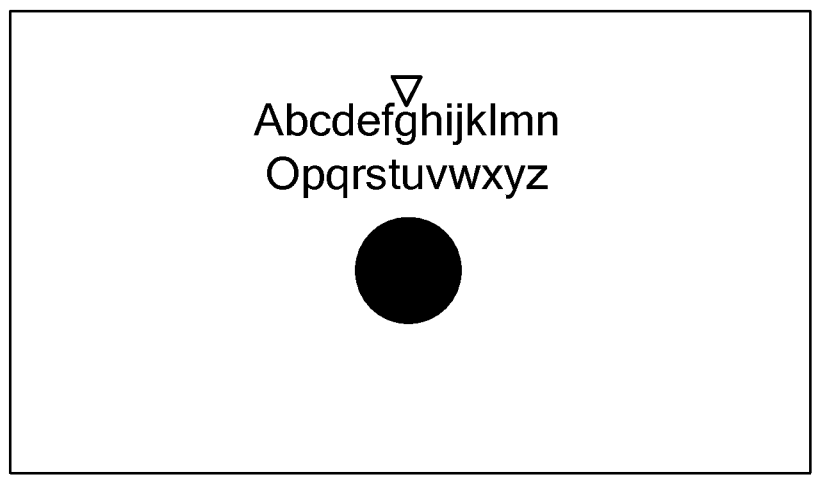
FIG. 5 is an instance diagram of character selection.

The location information feedback module calculates the position of the target point based on the position of the touch point and the position relation between the touch point and the target point, and the position of the target point is displayed on the screen. The set position of the target point is located at the place of 2 cm right above the position of the touch point. As shown in FIG. 5, the subjacent angle of the triangle indicates the position of the target point, and the black circular area is the position of the touch point. The user may determine, according to the displayed position of the target point, whether to perform adjustment again.

When the operation confirmation module confirms that the position of the target point is not required to be adjusted, the user may perform confirmation by touching and leaving the touch screen with the touch object.

As shown in FIG. 5, two lines of text information is displayed on the screen. When the existing touch screen operation mode is adopted, it is difficult for the user to select a certain letter therefrom by the finger and to implement a precise click and location.

However, the operation mode provided by the disclosure can implement a precise click and location. For example, when selecting the letter "g", the user may move the finger to the place of about 1 cm above the surface of the touch screen and of about 2 cm below "g". At this moment, the location information acquiring module will acquire the position information (x, y) of the finger, i.e., the touch point, through the non-contact touch screen technology. The location information feedback module calculates the position (x, y+2 cm) of the target point based on the position (x, y) of the finger, and displays the position on the screen (as shown in the triangle in FIG. 5). The user performs adjustment according to the displayed position of the target point, and it is assumed that the adjusted position of the finger is (x+k, y+k'). The location information feedback module then calculates the corresponding position (x+k, y+k'+2 cm) of the target point based on the updated position (x+k, y+k') of the finger, and displays the updated position of the target point on the screen. The above steps are repeated until the position of the operated target point is located at "g". At last, the finger of the user leaves the touch screen, so as to confirm the selection.

Embodiment 2

The common touch screen technology is adopted.

The location information setting module sets the position relation between the touch point and the target point as: the position of the target point is located at the place of 2 cm right above the position of the touch point.

The location information acquiring module locates the touch point when the finger comes into contact with the touch screen, and the touch screen acquires the position information of the touch point.

The location information feedback module calculates the position of the target point based on the position of the touch point and the position relation between the touch point and the target point, and displays the position of the target point on the screen. The set position of the target point is located at the place of 2 cm right above the position of the touch point. As shown in FIG. 5, the subjacent angle of the triangle indicates the position of the target point. The user can determine, according to the displayed position of the target point, whether to perform adjustment again.

When the operation confirmation module confirms that the position of the target point is not required to be adjusted again, the finger of the user leaving the touch screen refers to a confirmation operation.

It should be pointed out that, in this process, the position of the target point is controlled and adjusted through moving of the finger on the touch screen. Therefore, the finger should not leave the touch screen during the whole location process until it is confirmed.

As shown in FIG. 5, two lines of text information is displayed on the screen. When the existing touch screen operation mode is adopted, it is difficult for the user to select a certain letter therefrom by the finger and to implement precise click and location. However, the operation mode provided by the disclosure can implement a precise click and location. For example, when selecting the letter "g", the finger touches the place of above the touch screen and of about 2 cm below "g". At this moment, the location information acquiring module will acquire the position information (x, y) of the finger, i.e., the touch point, through the touch screen. The location information feedback module calculates the position (x, y+2 cm) of the target point based on the position (x, y) of the finger, and displays the position on the screen (as shown in the triangle in FIG. 5). The user performs adjustment according to the displayed position of the target point, and it is assumed that the position of the finger is (x+k, y+k'). The location information feedback module then calculates the corresponding position (x+k,y+k'+2 cm) of the target point based on the updated position (x+k, y+k') of the finger, and displays the updated position of the target point on the screen. The above steps are repeated until the position of the target point is located at "g". At last, the finger of the user leaves the touch screen, so as to confirm the selection.

The above are only preferred embodiments of the disclosure, and are not intended to limit the scope of protection of the claims of the disclosure.

The invention claimed is:

1. A method for implementing click and location operations on a touch screen, comprising:
   setting a position relation between a touch point and a target point such that the touch point is separated from the target point;
   acquiring position information of the touch point;
   calculating position information of the target point based on the position information of the touch point and the position relation between the touch point and the target point, and displaying a position of the target point; and
   performing a confirmation operation according to the displayed position of the target point.

2. The method according to claim 1, further comprising:
   before performing the confirmation operation according to the displayed position of the target point,
   when determining, according to the displayed position of the target point, that the position of the target point needs to be fine-tuned, moving a touch object and re-acquiring the position information of the touch point; and
   re-calculating the position information of the target point based on the re-acquired position information of the touch point and the position relation between the touch point and the target point, and displaying the re-calculated position of the target point.

3. The method according to claim 1, wherein the performing a confirmation operation according to the displayed position of the target point comprises:
   leaving, by a touch object, the touch screen, so as to confirm the position of the target point; or
   touching and then leaving, by a touch object, the touch screen, so as to confirm the position of the target point.

4. A method for implementing click and location operations on a touch screen, comprising:
   setting a position relation between a touch point and a target point such that the touch point is separated from the target point;
   acquiring position information of the touch point;
   calculating position information of the target point based on the position information of the touch point and the position relation between the touch point and the target point, and displaying a position of the target point; and
   performing a confirmation operation according to the displayed position of the target point,
   further comprising:
   after acquiring the position information of the touch point, determining, according to the position information of the touch point, whether the touch point is located in an area where a precise click and location is required; and
   when the touch point is located in an area where a precise click and location is required, calculating the position information of the target point based on the position information of the touch point and the position relation between the touch point and the target point.

5. The method according to claim 4, further comprising:
   before performing the confirmation operation according to the displayed position of the target point,
   when determining, according to the displayed position of the target point, that the position of the target point needs to be fine-tuned, moving a touch object and re-acquiring the position information of the touch point; and
   re-calculating the position information of the target point based on the re-acquired position information of the touch point and the position relation between the touch point and the target point, and displaying the re-calculated position of the target point.

6. A device for implementing click and location operations on a touch screen, comprising:
- a location information setting module configured to set a position relation between a touch point and a target point such that the touch point is separated the target point;
- a location information acquiring module configured to acquire position information of the touch point;
- a location information feedback module configured to: calculate position information of the target point based on the position information of the touch point and the position relation between the touch point and the target point, and display a position of the target point; and
- an operation confirming module configured to perform a confirmation operation for a user according to the displayed position of the target point.

7. The device according to claim 6, wherein
the location information acquiring module is further configured to, when a user determines, according to the displayed position of the target point, that the position of the target point needs to be fine-tuned and when the user moves a touch object, re-acquire the position information of the touch point; and
the location information feedback module is further configured to re-calculate the position information of the target point based on the re-acquired position information of the touch point, and display the re-calculated position of the target point.

8. The device according to claim 6, wherein
the operation confirming module is configured to, when a touch object leaves the touch screen, confirm the position of the target point; or when the touch object touches and then leaves the touch screen, confirm the position of the target point.

9. A device for implementing click and location operations on a touch screen, comprising:
- a location information setting module configured to set a position relation between a touch point and a target point such that the touch point is separated the target point;
- a location information acquiring module configured to acquire position information of the touch point;
- a location information feedback module configured to: calculate position information of the target point based on the position information of the touch point and the position relation between the touch point and the target point, and display a position of the target point; and
- an operation confirming module configured to perform a confirmation operation for a user according to the displayed position of the target point, wherein:
- the location information feedback module is further configured to: determine, according to the position information of the touch point, whether the touch point is located in an area where a precise click and location is required; and
- when the touch point is located in an area where a precise click and location is required, calculate the position information of the target point based on the position information of the touch point and the position relation between the touch point and the target point.

10. The device according to claim 9, wherein
the location information acquiring module is further configured to, when a user determines, according to the displayed position of the target point, that the position of the target point needs to be fine-tuned and when the user moves a touch object, re-acquire the position information of the touch point; and
the location information feedback module is further configured to re-calculate the position information of the target point based on the re-acquired position information of the touch point, and display the re-calculated position of the target point.

* * * * *